May 17, 1949.  H. S. HAMMOND  2,470,554
PORTABLE MOTOR MOUNTING
Filed July 9, 1945
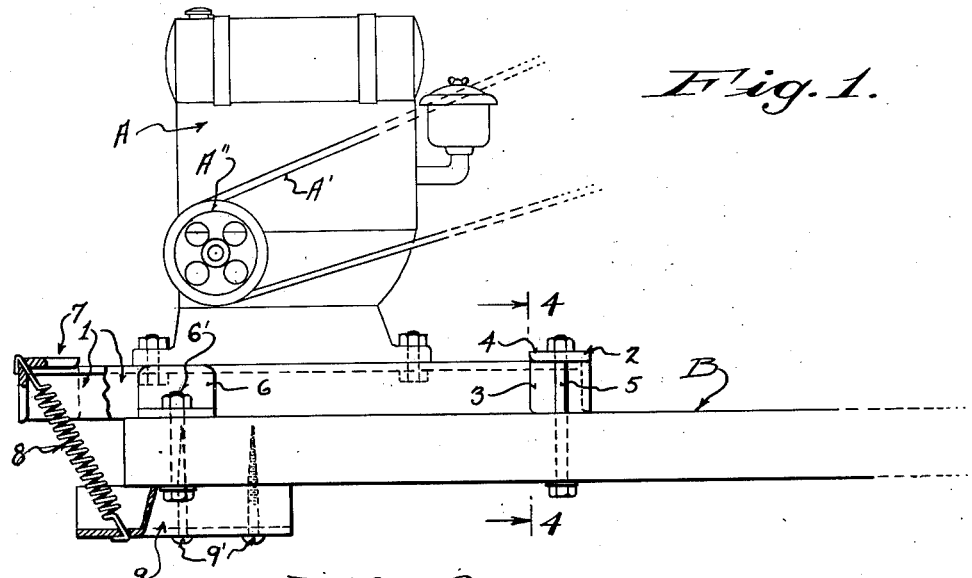
Fig. 1.
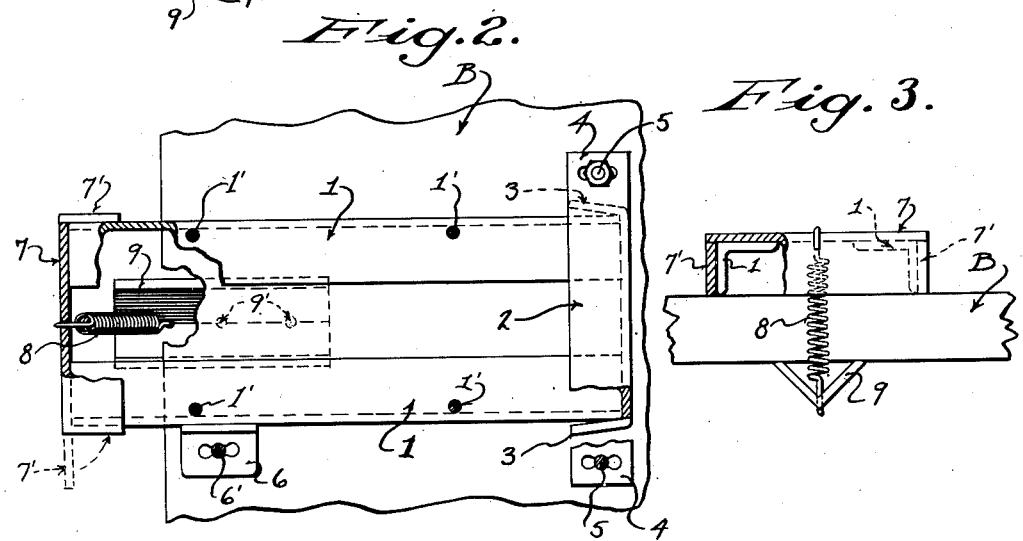
Fig. 2.
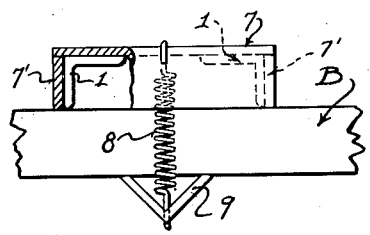
Fig. 3.
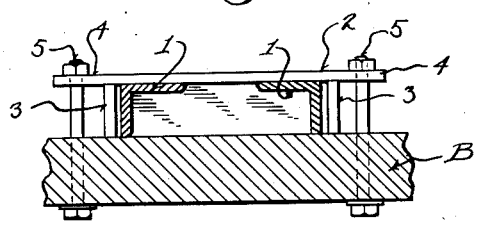
Fig. 4.
INVENTOR
HOMER S. HAMMOND
BY 
ATTORNEYS Patented May 17, 1949

2,470,554

UNITED STATES PATENT OFFICE 2,470,554

PORTABLE MOTOR MOUNTING

Homer S. Hammond, Madison, Wis.

Application July 9, 1945, Serial No. 603,958

2 Claims. (Cl. 248—19)

My invention refers to a portable motor mounting harness, to be fixed in juxtaposition to a plurality of machines, whereby a single motor may be utilized for imparting driving power to a series of shop equipped machines or the same may be equally applicable when coupled, for example, to a garden tractor, lawn mower, pump, or all such farm devices, whereby a single motor serves the purpose of imparting power to a series of devices, each of which is usually equipped with a motor. Thus the mounting will materially reduce the cost of a number of individual motors now provided for all such machines.

The specific object of my invention is to provide a pair of rails secured to the motor base and a plurality of mounting platforms, carrying coupling means, including guide clips for the reception of the motor rails, and spring clips for engaging the opposite ends of said rails, whereby the motor may be quickly adjusted and properly aligned with relation to a belt driven machine.

Another object of my invention is to provide a harness equipment for any type of motor, comprising a plurality of angle iron rails, whereby said equipment may be cheaply manufactured from standard material.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a side elevation of a motor mounting device embodying the features of my invention, with parts being broken away and in section to more clearly illustrate structural features.

Figure 2 is a plan view of the same with parts broken away and in section and with the motor removed from the rails.

Figure 3 is a detailed sectional end view of the mounting illustrating the spring clamping mechanism, with parts broken away and in section. And Figure 4 is a cross section of the opposite end of the mounting particularly illustrating the guide rail clip mechanism, the section being indicated by line 4—4 of Figure 1.

Referring by characters to the drawing, A indicates any form of motor, preferably of the internal combustion type, and B indicates a platform or floor, to which the motor is removably affixed.

The platform is associated with any type of machine which is to be supplied with a motor unit. Hence, in a plant having a series of machines, each one of the same is equipped with a motor supporting platform, whereby a single motor may be quickly moved, from one machine to another for imparting power thereto.

The base of the motor has secured thereto a pair of angle iron rails 1—1 by bolts 1'—1'. The motor so equipped is rigidly secured to the platform by a transversely disposed rail guide clip 2, which guide clip is formed from an angle iron section, with the ends of the vertical web cut away and folded backwardly to form angular flared tongues 3—3, the horizontal web of said clip forming wings 4, suitably slotted for the reception of anchor bolts 5, which bolts extend upwardly from the platform B.

One of the motor rails is engaged and aligned by an angle iron plate 6, which is also secured to the platform or floor by a bolt 6'. Hence, when the motor is so adjusted to the platform, it is properly aligned with reference to its belt drive, for connection to any type of machine to be powered.

The endless belt A' is suitably mounted upon a pulley wheel A'' carried by the motor shaft, as indicated in Figure 1.

After the portable motor is properly seated, with reference to the platform, as indicated in Figures 1 and 2, it will be noted that the ends of the rails project beyond the edge of the floor or platform, and for the purpose of yieldingly confining the said rail ends, I provide an angle iron clamp 7. The vertical end webs 7' of the clamp are cut away from the upper web of the angle iron and folded inwardly and backwardly to engage the vertical walls of the rails 1—1.

The clamp 7 has centrally secured thereto, in any suitable manner, one end of a coil spring 8. The opposite end of said spring is secured to an angular strip 9, which strip, in turn, is fastened to the bottom face of the platform B by screws 9', it being understood that one end of the strip projects beyond the edge of the platform, whereby the coil spring is angularly positioned clear of said platform edge.

From the foregoing description, with reference to the spring controlled clamp, it is apparent that to apply the same at the exposed ends of the rails 1—1, all that is necessary is to snap the angle iron clamp into engagement with said rail ends, whereby it will yieldingly confine this end of the motor rails in their proper position. Furthermore, by utilizing this yielding clamp, it provides means for securing the motor rails and also holds said motor in belt alignment and serves as a guide in case the belt should slip off, when said mechanism is utilized with a belt tightener. It, furthermore, eliminates the use of bolts to hold the motor in place and saves time as it provides an instant clipping means for the motor and permits a cushion or yield.

It follows that machines of all types may be provided with anchor platforms, such as described, and that when power is required to drive said machines, all that is necessary is simply to insert the motor upon the platform unit, whereby it will serve as a power drive for any and all such machines so equipped.

It is understood that the platform and associated elements carried thereby, for the reception and confinement of a removable motor, may be in the form of a skeleton frame, associated with two or more machines, whereby a single motor may be adjusted to said frame and rigidly held thereto for applying power to the machine which is fitted with the motor.

I claim:

1. A motor supporting platform associated with any type of machine, to which driving power is to be applied, comprising a transversely disposed clip pocket secured to the platform, angular webs at the ends of said pocket, an alined transversely disposed clamp having end webs, a coil spring connecting the clamp and platform, a motor base, and rails secured to the base, the opposite ends of the rails being engageable with the clip pocket and clamp.

2. A motor supporting platform associated with any type of machine to which driving power is to be applied, comprising a transversely disposed clip pocket secured to the platform, angular webs at the ends of said pocket, an alined transversely disposed clamp having end webs, a coil spring connecting the clamp and platform, a motor base, rails secured to the base, the opposite ends of the rails being engageable with the clip pocket and clamp, and a plate carried by the platform between the clip pocket and clamp adapted to engage one of the motor rails.

HOMER S. HAMMOND.

REFERENCES CITED

The following references are of record in the file of this patent:

UNITED STATES PATENTS

| Number | Name | Date |
|---|---|---|
| 717,226 | Liebich | Dec. 30, 1902 |
| 807,613 | Graves | Dec. 19, 1905 |
| 1,680,967 | Berry | Aug. 14, 1928 |
| 2,177,347 | Seldelmeyer | Oct. 24, 1939 |

FOREIGN PATENTS

| Number | Country | Date |
|---|---|---|
| 247,693 | Great Britain | Feb. 25, 1926 |